US012246546B2

(12) United States Patent
Heinl

(10) Patent No.: US 12,246,546 B2
(45) Date of Patent: Mar. 11, 2025

(54) DEVICE FOR GUIDING A PRINTER

(71) Applicant: COLOP Digital GmbH, Wels (AT)

(72) Inventor: Cedric Heinl, Wels (AT)

(73) Assignee: COLOP DIGITAL GMBH, Wels (AT)

( * ) Notice: Subject to any disclaimer, the term of this patent is extended or adjusted under 35 U.S.C. 154(b) by 0 days.

(21) Appl. No.: 17/923,783

(22) PCT Filed: May 14, 2021

(86) PCT No.: PCT/EP2021/062843
§ 371 (c)(1),
(2) Date: Nov. 7, 2022

(87) PCT Pub. No.: WO2021/229061
PCT Pub. Date: Nov. 18, 2021

(65) Prior Publication Data

US 2023/0173825 A1 Jun. 8, 2023

(30) Foreign Application Priority Data

May 14, 2020 (EP) .................................... 20174598

(51) Int. Cl.

| | |
|---|---|
| ***B41J 3/36*** | (2006.01) |
| ***B41J 2/175*** | (2006.01) |
| ***B41J 25/00*** | (2006.01) |
| ***B41J 29/02*** | (2006.01) |

(52) U.S. Cl.
CPC ............ *B41J 3/36* (2013.01); *B41J 2/17503* (2013.01); *B41J 25/001* (2013.01); *B41J 29/02* (2013.01)

(58) Field of Classification Search
CPC ........ B41J 3/36; B41J 2/17503; B41J 25/001; B41J 29/02
See application file for complete search history.

(56) References Cited

U.S. PATENT DOCUMENTS

| | | | |
|---|---|---|---|
| 6,092,941 | A | 7/2000 | Imai |
| 2006/0275068 | A1 | 12/2006 | Breton |

FOREIGN PATENT DOCUMENTS

| | | | |
|---|---|---|---|
| FR | 2 561 992 | A1 | 10/1985 |
| JP | H01-238964 | A | 9/1989 |
| WO | 92/16375 | A1 | 10/1992 |

OTHER PUBLICATIONS

International Search Report and Written Opinion of the International Searching Authority for International Patent Application No. PCT/EP2021/062843 mailed Sep. 24, 2021, 14 pages.
Extended European Search Report for European Patent Application No. 20174598.1 mailed Oct. 19, 2020, 10 pages.

*Primary Examiner* — Justin Seo
(74) *Attorney, Agent, or Firm* — Merchant & Gould P.C.

(57) ABSTRACT

A device (1) is for guiding printer (20). The device (1) is utilized in a method for using a handheld electronic printer (20) with the device (1). The device (1) includes a base (2) having at least one guide (5), and a carriage (3) having at least two separate links (26, 27) engaged with the at least one guide (5). The at least one guide (5) has at least two linear sections (7, 8) being spaced apart and parallel. The at least one guide (5) includes at least two changeover sections (10, 11), each connecting two linear sections (7, 8). The changeover sections (10, 11) are arranged at different positions of the linear sections (7, 8) the changeover sections respectively connect.

13 Claims, 4 Drawing Sheets

DEVICE FOR GUIDING A PRINTER

This application is a National Stage Application of PCT/EP2021/062843, filed 14 May 2021, which claims benefit of European Patent Application Serial No. 20174598.1, filed 14 May 2020 and which applications are incorporated herein by reference. To the extent appropriate, a claim of priority is made to each of the above disclosed applications.

BACKGROUND OF THE INVENTION

The invention concerns a device for guiding a printer, a use of the device and a method for using a handheld electronic printer with the device. Specifically, the invention concerns a device for guiding a handheld electronic printer, for example a handheld inkjet printer, in particular an electronic hand stamp having an inkjet printhead.

All printers are limited with respect to the area that can be printed in one go, i.e. in one continuous movement. Most often, the width of this area, also referred to as the swath width, is defined by the printer hardware, e.g. a printhead. for example, an inkjet printhead typically achieves a swath width of several millimetres, e.g. 5 to 25.4 mm. As soon as an area with both dimensions larger than the swath width shall be printed, multiple swaths must be printed in sequence at different positions. Usually, the swaths are arranged in parallel and shifted exactly one swath width. In the case of a handheld printer, the precise alignment of these swaths is difficult to achieve manually. More often than not, misaligned swaths lead to unsatisfactory printing results. In particular, overlaps between swaths and unintended gaps between swaths cannot be reliably avoided.

Applications where mobile printing of areas larger than a typical swath width is of interest are: printing of customised business cards; printing of inlays, e.g. paper or plastics inlays. Such inlays are often used for installations or machines and comprise contact information, service information or product-specific information. In such applications, the area to be printed typically requires three parallel swaths to be aligned and printed as precisely as possible.

Existing handheld printers seek to alleviate the problem of misalignment by detecting the actual path taken by the printer and compensating for deviations from a perfect parallel path by introducing a corresponding offset in controlling the printhead. For instance, the printed swath may be dynamically shifted within the limitations of the printhead to cancel a temporary offset from the parallel path. One disadvantage of this approach is that the printed swath width needs to be smaller than the maximum swath width of the printhead in order to provide room for compensating shifts transverse to the path in either direction. Another disadvantage is that the precision of the compensation is limited by the precision of the detection of the actual path, e.g. by optical sensors, and the latency or time delay of the compensation.

US 2006/275068 A1 shows a manually operated printing device. The printing device is pressed against a printout surface and a print head is manually moved along a steering beam in a housing. Thereby a guide attached to the print head interacts with the steering beam. The print head can be moved in two opposite directions. A path is provided for each of these directions; the two paths are parallel to each other and have an offset from each other. Further, at least one sensor is provided to determine parameters of the movement of the print head relative to the printout surface.

U.S. Pat. No. 6,092,941 A shows a printer with a removable and manually operable print head. The print head can be moved over a print object by means of a guide. The print head is equipped with a marker-reader that measures the timing of the print head with respect to a timing fence equipped with markings.

WO 92/16375 A1 shows a printer which is manually guided over an object on which printing is to be effected. The printer can be mounted on a device comprising a bar and a rod orthogonal to the bar, which guide the printer. The printer has one or more rollers by means of which the printer can be rolled over the object.

FR 2 561 992 A1 also shows a printer which is manually guided over a substrate. A device for positioning is provided on which the printer is mounted. The device can have marks that can be detected by a sensor and allow the determination of the position of the printer.

Another print head is known from JP H01 238964 A, which print head is manually guided over a substrate. The print head is mounted on a ruler and moved along a rack. The distance covered by the print head is detected by means of a gear or a roller.

SUMMARY OF THE INVENTION

It is an object of the present invention to provide a device that is capable of guiding the manual motion of a handheld printer such that printing at least two swaths can be achieved more reliably with a more precise alignment compared to an unguided manual motion.

The invention proposes a device comprising a base having at least one guide, a carriage having at least two separate links engaged with the at least one guide, wherein the at least one guide comprises at least two linear sections being spaced apart and parallel, wherein the at least one guide comprises at least two changeover sections, each connecting two linear sections, wherein the changeover sections are arranged at different positions of the linear sections they respectively connect. The guide can be any guide element. The at least two separate links of the carriage function as guide points. Each link that is engaged with a guide, follows along that guide in a movement of the carriage. The position of the links are the points where the carriage is being guided. Each link alone is provided such that if it were the only link, the carriage could rotate around the guide point this link defines. In other words, each link engaged with a guide limits a translational motion of the carriage to one or two directions along the respective guide and allows free rotational motion of the carriage in a plane parallel to the respective guide. The at least two linear sections of the guide may be spaced apart such that their distance matches a swath width. If the at least one guide comprises three or more linear sections, they may be spaced apart and equidistant. The changeover sections may connect the linear sections at their ends on one side. More specifically, each connection between two neighbouring linear sections may be provided by two changeover sections, wherein a first changeover section connects the ends of the two linear sections and a second changeover section is spaced apart from the first changeover section and provides a passage for a second link of the carriage when a first link of the carriage moves through the first changeover section. That the changeover sections are arranged at different positions of the linear sections they respectively connect means that also the links may be arranged at different positions of the linear sections, i.e. the links are displaced in a direction of motion along the linear sections. They may or may not be displaced in a direction transverse to the direction of motion along the linear sections. Consequently, a tangent line of an imaginary circumcircle of one link (or the guide point it defines) through the other link intersects a linear section of the guide, thereby disabling a rotation of the carriage around any single link. A distance between the changeover sections in a direction of motion along the linear sections may be at least 1 cm, optionally at least 2 cm.

Within the scope of the present disclosure, the at least one guide may be provided by a slot, a groove, a rail or a track. These are specific embodiments of the structure of the guide, which are relatively simple to manufacture.

Optionally, the changeover sections may be curved. Curved changeover sections can extend smoothly from a first linear section to a second linear section they connect. A curved path of the changeover sections facilitates a smooth movement of the carriage through the changeover sections. The path of the two changeover sections may have for example the shape of a semicircle. Changeover sections connecting the same linear sections generally should have the same path shape. An essentially semi-circular path achieves an easy reversal of the direction of movement of the carriage between neighbouring linear sections connected by the respective changeover sections.

The at least two separate links may optionally be movably attached to the at least one guide. The guide may form a viewing for the carriage. For example, the links may be mounted on the guide or locked within or around the guide. In these instances, it can be avoided, that the carriage is lifted off or otherwise coming off the guide, which would compromise a precise alignment of the guided motion.

In an optional embodiment, the base may have at least two guides, each comprising at least two linear sections and at least two changeover sections connecting the respective linear sections, wherein the changeover sections belonging to the same guide are arranged at different positions of the linear sections they respectively connect, wherein the carriage has at least three separate links of which at least one link is engaged with each of the at least two guides. The at least two guides may be arranged at a distance from each other, for example on different sides of the carriage. This allows for a more precise guidance of the carriage, because the average distance of any point of the carriage from the next guide or guide point is reduced. In general, changeover sections belonging to different guides may be arranged at the same position in a direction of motion along the linear sections. In an example of this optional embodiment, two links are engaged with a first guide and a third link is engaged with a second guide.

Optionally, the base may comprise a receptacle for a substrate. The receptacle may be provided by a frame formed by the base or a recess in the base. The receptacle provides stable alignment of the substrate relative to the guide and consequently relative to the carriage and a printer received on the carriage.

In this context, the device may further comprise a reference strip that is arranged between the base and the carriage, wherein the carriage is movable with respect to the reference strip in a first direction, which is parallel to the two linear sections of the at least one guide, wherein the reference strip is movable with respect to the base in a second direction, which is transverse (for example orthogonal) to the first direction, wherein the reference strip extends across the receptacle in the first direction and on both ends beyond an edge of the receptacle. Both, the first direction and the second direction may be arranged in a plane that is parallel to a plane of a substrate received in the receptacle. The reference strip serves to bridge a gap between the base and the substrate and to avoid interruptions perceived by sensors on a printer tracking the displacement of the printer and controlling the printing accordingly. In other words, the reference strip supports robust horizontal positioning beyond an edge of the receptacle of a printer received on the carriage for use with the present device.

In a specific embodiment, the thickness of the reference strip defined above may optionally be below 1 mm, preferably below 0.7 mm, more preferably 0.5 mm. As the reference strip is typically arranged between the substrate and a printer received on the carriage, it causes a distance between the printer and the substrate corresponding to the thickness of the reference strip. It may be desirable, to minimise this distance to avoid blurring of the printing result, e.g. due to a spread of an ink spray produced by the printer.

Optionally, the bottom side of the carriage facing the base may comprise a groove for receiving the reference strip. A width of the groove may correspond to the width of the reference strip (e.g. in case of a rectangular cross-section of the reference strip). The reference strip may be received fully or at least partially in the groove. A depth of the groove may correspond approximately to the thickness of the reference strip. The groove may be responsible for dragging the reference strip along when the carriage is displaced in the second direction (i.e. through the changeover sections).

The reference strip may be made of a ferromagnetic material, wherein the carriage may comprise at least one magnet arranged to hold the reference strip at the bottom side of the carriage facing the base. The material of the reference strip may be provided with a matte finish in order to facilitate reliable position detection by optical sensors. The carriage may comprise two magnets, for example two permanent magnets to hold the reference strip. The at least one magnet may also drag the reference strip along when the carriage is displaced in the second direction. The precision of the movement of reference strip in the second direction is not critical or important, because the printer ignores transverse (i.e. in the second direction) positioning signals. In case of an existing groove at the bottom side of the carriage for receiving the reference strip, the at least one magnet may serve to hold the reference strip within that groove.

The invention also proposes a use of the device disclosed above with a handheld electronic printer having an inkjet printhead. As pointed out in the outset, the present disclosure is particularly useful to achieve reliable precise alignment of printing swaths when using a handheld printer.

Finally, the invention proposes a method for using a printer with the device disclosed above, comprising the steps of engaging the printer with the carriage, starting a printing procedure with the printer and while printing: moving the carriage together with the printer along a first linear section of the at least one guide, moving the carriage together with the printer through a changeover section connecting the first linear section with a second linear section of the at least one guide, and moving the carriage together with the printer along the second linear section of the at least one guide. After completing the movement, the printing procedure can be stopped with the printer or the printer stops automatically after finishing the printing. Engaging the printer with the carriage can be accomplished by putting the printer onto the carriage, optionally receiving the printer in a receptacle provided by the carriage or locking the printer on the carriage. Starting a printing procedure with the printer may be achieved by performing a user interaction on the printer, for example pressing a button, or by remotely controlling the printer, for example by triggering a printing procedure from a mobile or desktop app connected to the printer via a data connection. Typically, the movement through the first linear section and movement through the second linear section are parallel and in opposite directions. Optionally, the guide may be provided with additional linear sections with changeover sections chaining subsequent linear sections together and the movement may be continued until the final linear section or until the printing procedure is finished.

In a specific embodiment, the method may be particular for using a printer with a device having a reference strip as defined above and comprising the steps of detecting by the printer a reversal of a direction of movement parallel to the first direction, and switching by the printer to the next swath to be printed responsive to the detected reversal of the direction of movement. When the guiding device has a reference strip, which in use is arranged between the substrate and a position sensor of the printer, the printer cannot detect a displacement in the second direction (e.g. vertical displacement transverse to a horizontal direction of the swaths). In that case, the printer can assume that it may start printing the next swath as soon as it detects that the movement in the first direction (e.g. horizontally) has reversed. In order to enable this operating mode, the printer is to be aware of the use of a reference strip. This may be achieved by manual configuration of the printer or by an interface between the guiding device and the printer (e.g. a control switch that is mechanically triggered when the printer is inserted into the carriage).

BRIEF DESCRIPTION OF THE DRAWINGS

Referring now to the drawings, wherein the figures are for purposes of illustrating the present disclosure and not for purposes of limiting the same, FIG. 1 schematically a top view of a first exemplary embodiment of the device for guiding a printer according to the present disclosure.

DETAILED DESCRIPTION OF THE PREFERRED EMBODIMENT

Figure 1:
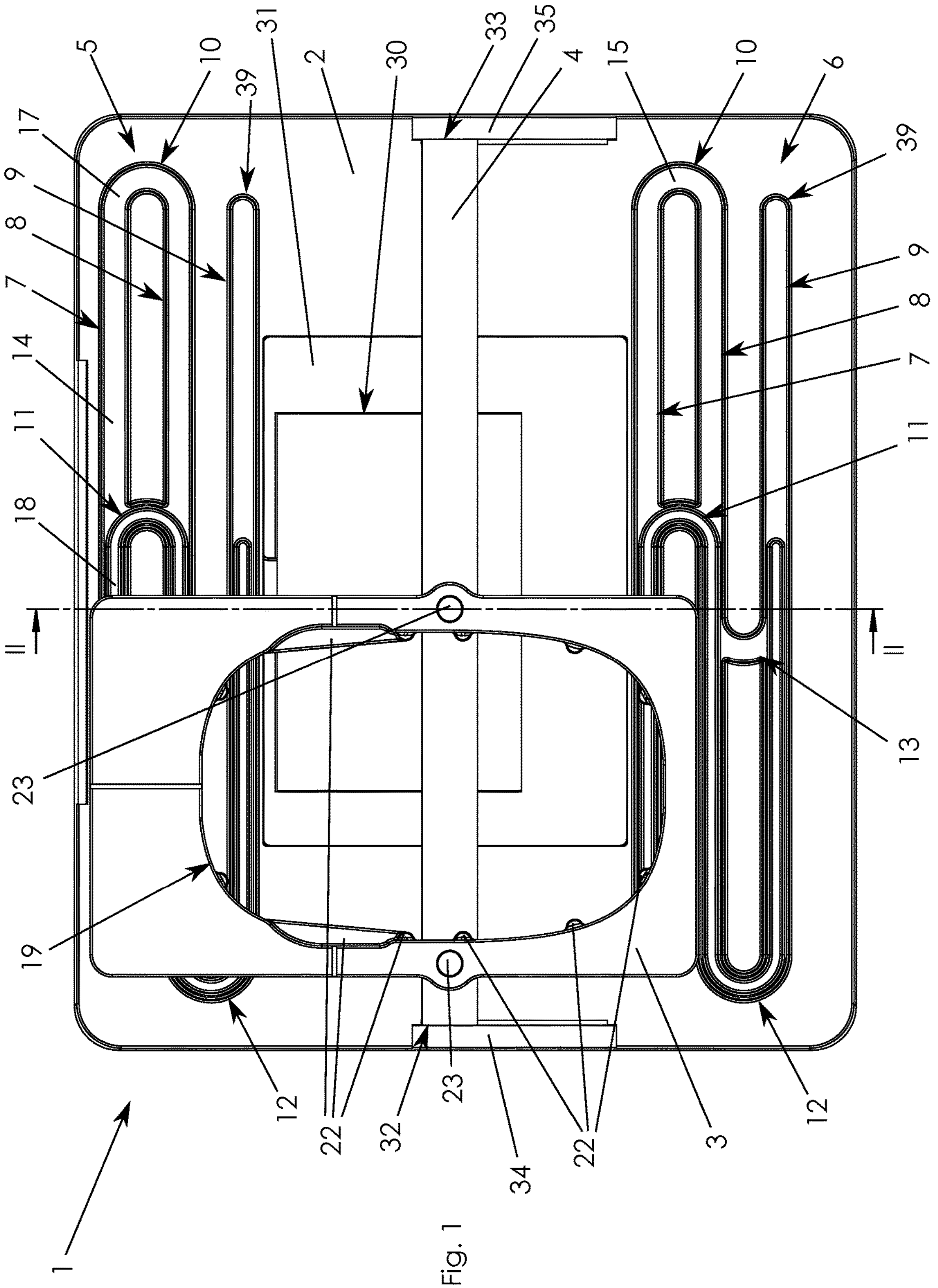
Figure 2:
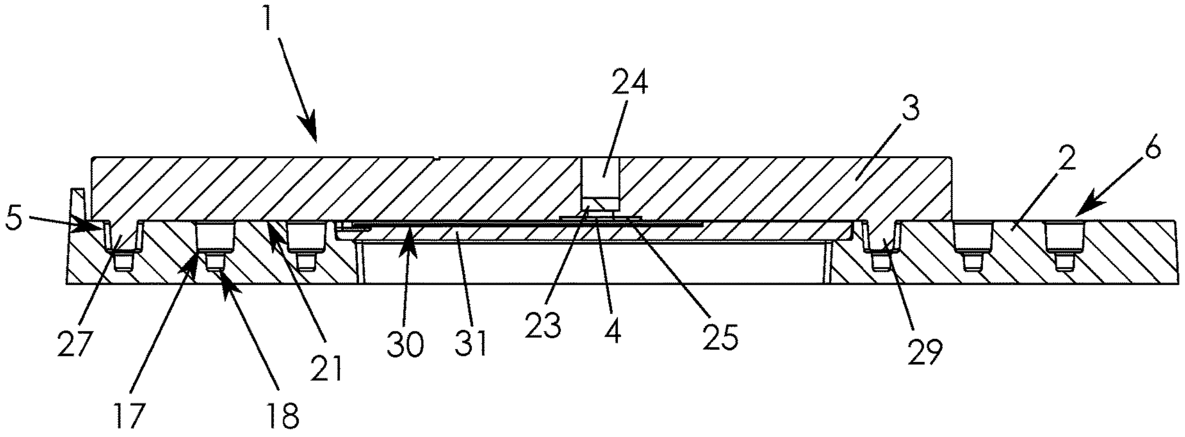
FIG. 2 schematically a section along the line II-II of the device shown in FIG. 1.

FIGS. 1 and 2 show a device 1 for guiding a printer. The device comprises a base 2, a carriage 3 and a reference strip 4. The base 2 has two guides 5, 6. Each guide 5, 6 comprises three linear sections 7, 8, 9. The linear sections 7, 8, 9 are spaced apart and parallel. Each guide 5, 6 further comprises four changeover sections 10, 11, 12, 13. The first changeover section 10 connects an end of the first linear section 7 with a first end of the second linear section 8. The second changeover section 11 connects the first linear section 7 with the second linear section 8 at an intermediate position between the ends of the linear sections 7, 8. The third changeover section 12 connects a second end of the second linear section 8 with an end of the third linear section 9. The fourth changeover section 13 connects the second linear section 8 with the third linear section 9 at an intermediate position between the ends of the linear sections 8, 9. The distance between the first changeover section 10 and the second changeover section 11 is the same as the distance between third changeover section 12 and the fourth changeover section 13. All changeover sections 10, 11, 12, 13 are curved and particularly follow a semi-circular path.

The guides 5, 6 are provided by continuous grooves 14, 15 formed in the base 2. The profile of the grooves 14, 15 is different in parts of the guides 5, 6. A first part of the guides 5, 6 comprises a part of the first linear section 7 between the first end 16 of the guides 5, 6 (see FIG. 3) and the second changeover section 11, the second changeover section 11, a part of the second linear section 8 between the second changeover section 11 and the third changeover section 12, the third changeover section 12 and a part of the third linear section 9. This first part of the guides 5, 6 has a first profile. The first profile is two-tiered, with a first tier 17 at a first depth and a second tier 18 at the full depth of the respective groove 14, 15. A second part of the guides 5, 6 comprises the remaining parts of the linear sections 7, 8, 9 as well as the first changeover section 10 and the fourth changeover section 13. This second part of the guides 5, 6 has a second profile. The second profile corresponds to only the first tier 17 of the first profile. The purpose of the different profiles is to structurally limit the possible movements and positions of the carriage 3 as will become apparent below.

Figure 3:
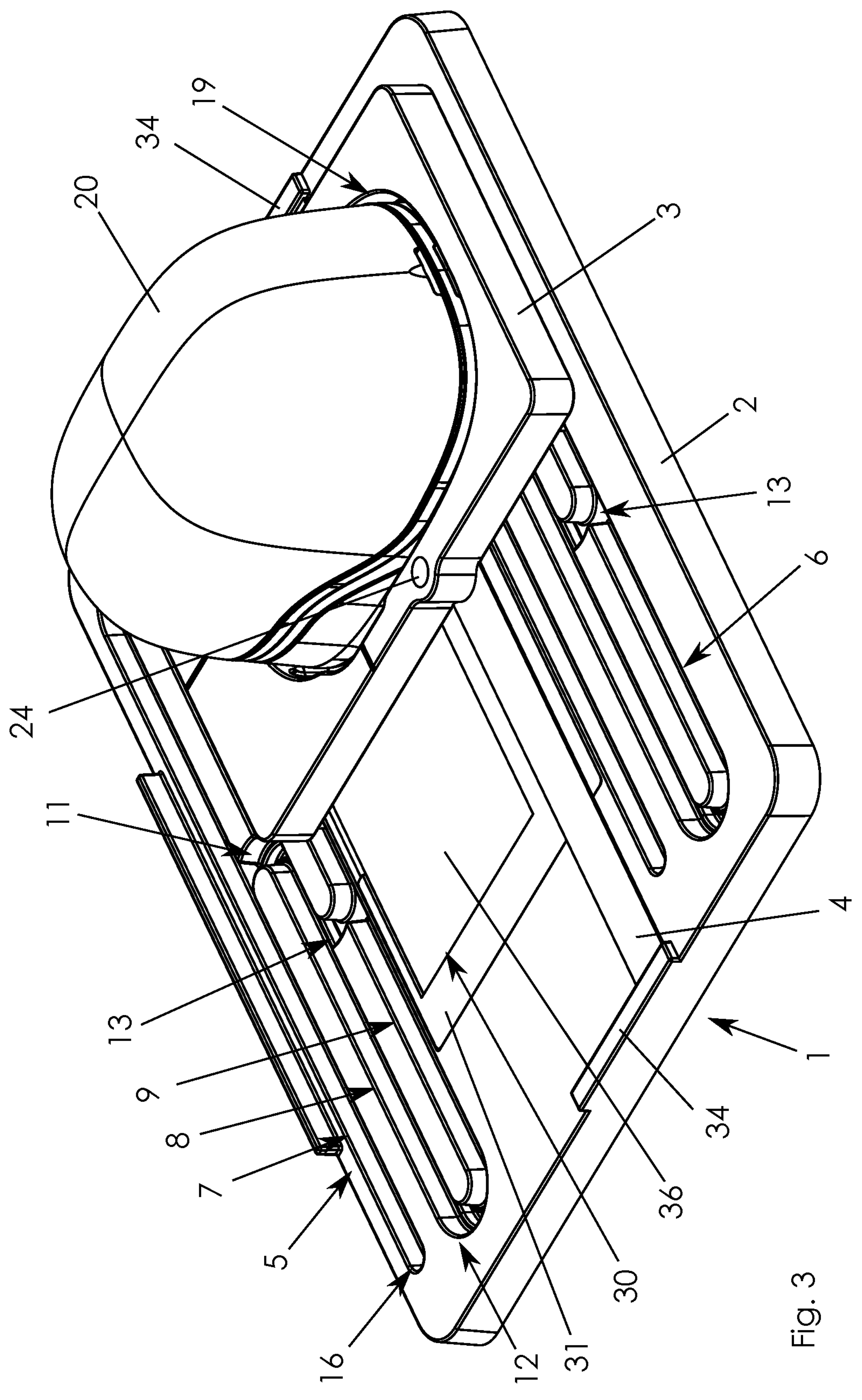
FIG. 3 schematically a pictorial of the device according to FIG. 1 in use with a handheld printer in a final position.

The carriage 3 comprises an essentially rectangular frame surrounding a clearance 19 for receiving a handheld printer 20 (see FIG. 3). The outline of the clearance 19 essentially corresponds to the footprint of the handheld printer 20. At a bottom side 21 of the carriage 3 (see FIG. 2), which faces the base 2, the clearance 19 is delimited by several protrusions 22 to support a printer 20 above the base 2 and frictionally engage with the printer 20 within the clearance 19 (see also FIG. 5). The carriage 3 further comprises two permanent magnets 23 arranged in holes 24 above a groove 25 for receiving the reference strip 4 in the bottom side 21 of the carriage 3 facing the base 2. The groove 25 extends in a first direction parallel to the linear sections 7, 8, 9. The carriage 3 is moveable with respect to the reference strip 4 in a first direction parallel to the linear sections 7, 8, 9.

Figure 4:
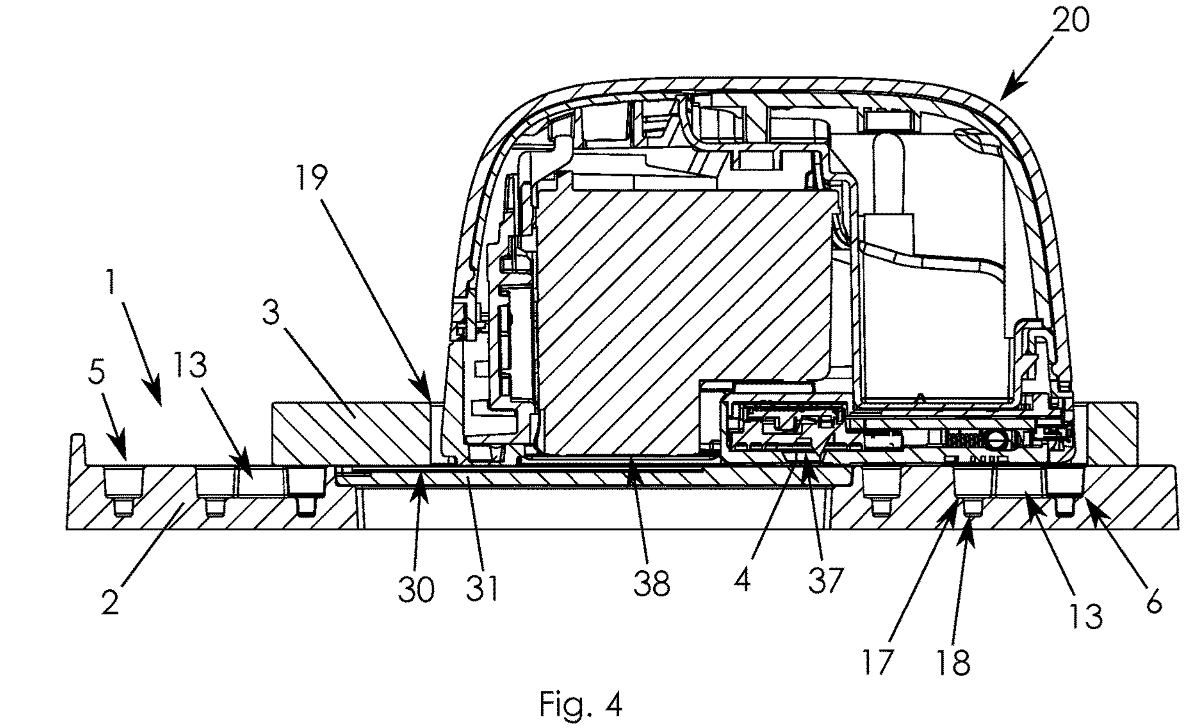
FIG. 4 schematically a section of the device and printer shown in FIG. 3 at an intermediate position during printing a third swath.

The carriage 3 has four separate links 26, 27, 28, 29 provided by pins extending from the bottom side 21 (see FIG. 2 and FIG. 4). The pins are around, i.e. they have a rotational symmetry around an axis orthogonal to the bottom side 21 of the carriage 3. The first link 26 and the second link 27 are engaged with the first guide 5. The third link 28 and the fourth link 29 are engaged with the second guide 26. The profile of the first link 26 and the third link 28 corresponds to the first profile of the guides 5, 6. The profile of the second link 27 and the fourth link 29 corresponds to the second profile of the guides 5, 6 (note that the section in FIG. 2 is slightly offset from the centre of the links 27, 29). Correspondingly, the first link 26 is engaged with the first part of the first guide 5 and the third link 28 is engaged with the first part of the second guide 6. As the second profile is completely contained within the first profile, the second link 27 and the fourth link 29 can move between the first part and second part of the respective guide 5, 6.

The base 2 comprises a receptacle 30 for a substrate 36. The receptacle 30 is provided as a recess in an inset 31 of the base 2. The inset 31 can be replaced by alternative insets providing recesses of different dimensions, such that the receptacle 30 can be adapted to substrates of different dimensions. In the example shown in FIG. 1, the receptacle 30 is essentially a rectangular recess with an area of a business card and a depth corresponding to a typical paper thickness used for business cards (e.g. between 0.3 and 0.4 mm).

The reference strip 4 is arranged between the base 2 and the carriage 3. It extends across the receptacle 30 of the base 2 in a first direction parallel to the linear sections 7, 8, 9. More specifically, the reference strip 4 extends beyond both of the transverse edges of the receptacle 30 and even beyond the transverse edges of the inset 31. The ends 32, 33 of the reference strip 4 abut on a respective guide bar 34, 35 at the transverse edges of the base 2. The reference strip 4 is movable with respect to the base 2 in a second direction, which is transverse to the first direction, i.e. transverse to the linear sections 7, 8, 9. The guide bars 34, 35 guide such a movement of the reference strip 4 relative to the base 2 in a second direction. The reference strip 4 is a metal strip (generally, any ferromagnetic material works) with the thickness of 0.5 mm and with a matte surface. Correspondingly, the groove 25 in the carriage 3 has a depth of 0.5 mm.

Figure 5:
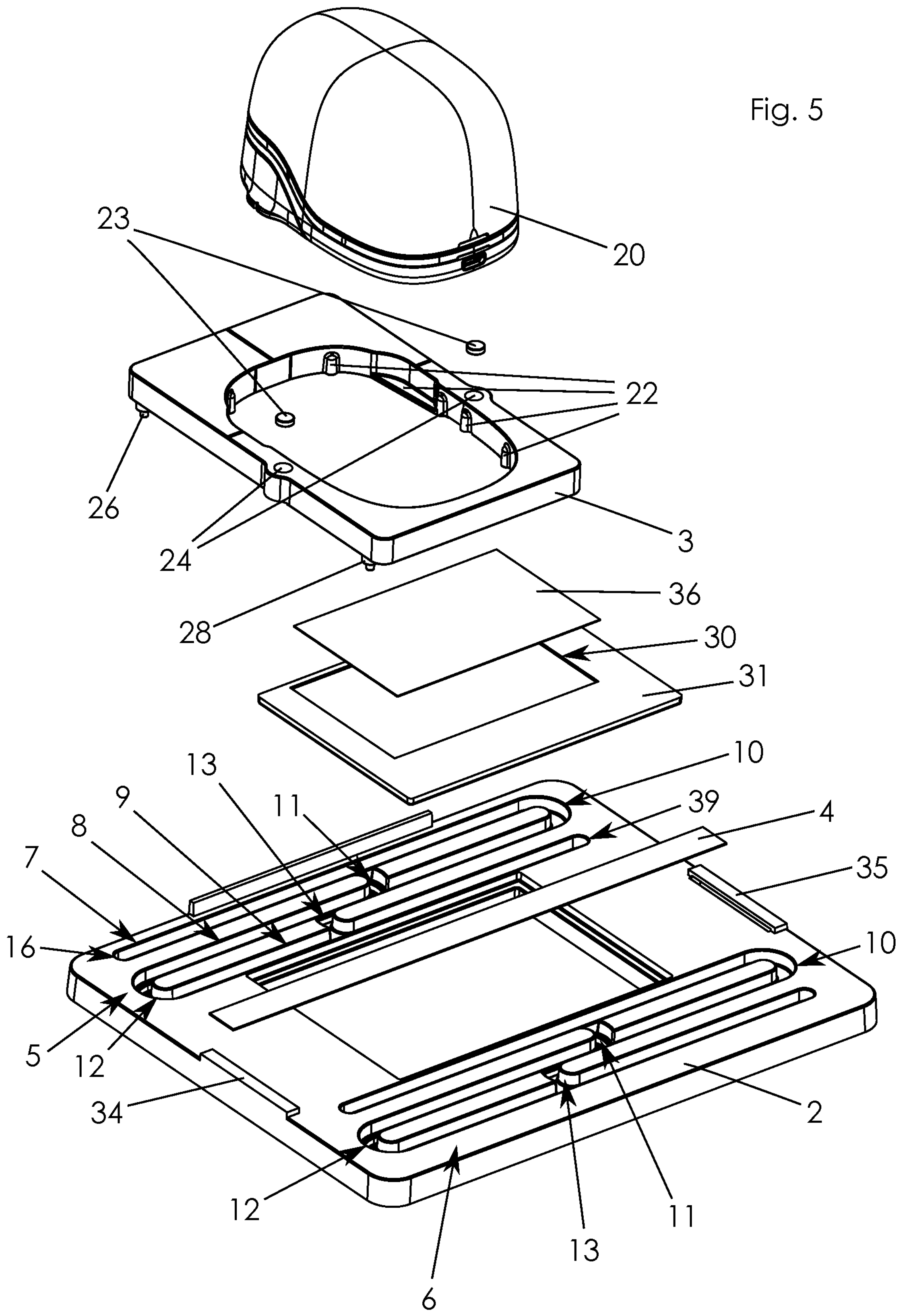
FIG. 5 schematically and exploded-view of the device and printer shown in FIG. 3.

FIGS. 3, 4 and 5 show the device 1 in use with a handheld printer 20. The printer 20 is arranged in the clearance 19 of the carriage 3 of the device 1. The position of the reference strip 4 relative to the carriage 3 is such that an optical position sensor 37 of the printer 20 faces the reference strip 4 below the printer 20. An inkjet printhead 38 of the printer 20 is guided in parallel swaths above the substrate 36 received in the receptacle 30.

For printing the substrate 31, the printer 20 is engaged with the carriage 3 and the user starts the printing procedure the printer 20. At the start of the printing procedure, the first link 26 and the third link 28 of the carriage 3 are arranged at the first end 16 of the respective guide 5, 6. During the printing procedure, the user moves the carriage 3 together with the printer 20 along the first linear section 7 of the guides 5, 6 until the second and fourth links 27, 29 reach the first changeover section 10 and at the same time the first and third links 26, 28 reach the second changeover section 11. During this movement, the optical position sensor 37 of the printer 20 detects the speed and distance of the horizontal movement relative to the reference strip 4 and controls the printhead 38 to print a first swath when the printhead 38 travels over the receptacle 30. The user then moves the carriage 3 together with the printer 20 through the first and second changeover sections 10, 11 connecting the first linear section 7 with the second linear section 8 of the guides 5, 6. The optical position sensor 37 does not detect the vertical movement relative to the receptacle 30 and substrate 36, because the reference strip 4 follows the carriage 3 in the second direction transverse to the first linear section 7. However, the printer 20 detects the reversal of the direction of the horizontal movement and responsive to this detection switches to the second swath to be printed. From there, the user moves the carriage 3 together with the printer 20 in the reverse direction horizontally along the second linear section 8 of the guides 5, 6 until the first and third links 26, 28 reach the third changeover section 12 and at the same time the second and fourth links 27, 29 reach the fourth changeover section 13. During this movement, the optical position sensor 37 of the printer 20 again detects the speed and distance of the horizontal movement relative to the reference group 4 and controls the printed 38 to print the second swath in the reverse direction when the printer 38 travels over the receptacle 30. At this point, the user moves the carriage 3 together with the printer 20 through the third and fourth changeover sections 12, 13 connecting the second linear section 8 with the third linear section 9 of the guides 5, 6. Again, the printer detects the reversal of the direction of the horizontal movement and switches to the third swath to be printed. Finally, the user moves the carriage 3 together with the printer 20 along the third linear section 9 until the second and fourth links 27, 29 reach the final position at second end 39 of the guides 5, 6. During this movement, the printer 20 prints the third swath according to the man detected by the optical position sensor 37 similar to the first swath.

According to a second exemplary embodiment, the first profile and second profile of the grooves 14, 15 may be exchanged between the first guide 5 and second guide 6. For example, the groove 14 of the first guide 5 has the profiles arranged as described above and the groove 15 of the second guide 6 has the following profiles: The first part of the second guide 6 comprises a part of the first linear section 7 starting at a distance from the first end 16 of the second guide 5 and to the first changeover section 10, the first changeover section 10, a part of the second linear section 8 between the first changeover section 10 and the fourth changeover section 13, the fourth changeover section 13 and a part of the third linear section 9 from the fourth changeover section 13 to the second end 39. This first part of the second guide 6 has a first profile. The first profile is two-tiered, with a first tier at a first depth and a second tier at the full depth of the groove 15. A second part of the second guide 6 comprises the remaining parts of the linear sections 7, 8, 9 as well as the second changeover section 11 and the third changeover section 12. This second part of the second guide 6 has a second profile. The second profile corresponds to only the first tier 17 of the first profile. The purpose of the different profiles is to further limit the possible movements and positions of the carriage 3.

In this embodiment, the profile of the first link 26 and the fourth link 29 of the carriage 3 corresponds to the first profile of the guides 5, 6. The profile of the second link 27 and the third link 28 corresponds to the second profile of the guides 5, 6. Correspondingly, the first link 26 is engaged with the first part of the first guide 5 and the fourth link 29 is engaged with the first part of the second guide 6. As the second profile is completely contained within the first profile, the second link 27 and the third link 29 can move between the first part and second part of the respective guide 5, 6.

An advantage of this embodiment is that an undesired tilting of the carriage 3 is more effectively prevented when the second link 27 and the fourth link 29 reach the second changeover section 11 (through which only the first link 26 and the third link 28 should pass), because the third link 28 having the first profile cannot pass through the second changeover section 11 of the second guide 6 having the second profile.

According to a third exemplary embodiment, the profiles of first guide 5 and second guide 6 and of the respective links of the carriage 3 may be interchanged with respect to the second exemplary embodiment.

The invention claimed is:

1. A device for guiding a printer, the device comprising:

a base having at least one guide, a carriage having at least two separate links engaged with the at least one guide, wherein the at least one guide comprises at least two linear sections being spaced apart and parallel, wherein the at least one guide comprises at least two changeover sections, each of the changeover sections connecting two linear sections, wherein the changeover sections are arranged at different positions of the linear sections the changeover sections respectively connect; and wherein the base has at least two guides, each of the guides comprising at least three linear sections and at least two changeover sections connecting the respective linear sections, wherein the changeover sections belonging to the same guide are arranged at different positions of the linear sections the changeover sections respectively connect, wherein the carriage has at least three separate links of which at least one link is engaged with one of the at least two guides.

2. The device according to claim 1, wherein the change-over sections are curved.

3. The device according to claim 1, wherein the at least two separate links are movably attached to the at least one guide.

4. The device according to claim 1, wherein the base comprises a receptacle for a substrate.

5. The device according to claim 4, wherein the device comprises a reference strip arranged between the base and the carriage, wherein the carriage is movable with respect to the reference strip in a first direction, which is parallel to the three linear sections of each of the at least two guides, wherein two guides, wherein the reference strip is movable with respect to the base in a second direction, which is transverse to the first direction, wherein the reference strip extends across the receptacle in the first direction and on both ends beyond an edge of the receptacle.

6. The device according to claim 5, wherein the thickness of the reference strip is below 1 mm.

7. The device according to claim 5, wherein a bottom side of the carriage facing the base comprises a groove for receiving the reference strip.

8. The device according to claim 5, wherein the reference strip is made of a ferromagnetic material, wherein the carriage comprises at least one magnet arranged to hold the reference strip at a bottom side of the carriage facing the base.

9. The device according to claim 1, wherein the device is configured for using with a handheld electronic printer having an inkjet printhead.

10. A method for using a handheld electronic printer with the device according to claim 1, comprising the following steps:

engaging the printer with the carriage, starting a printing procedure with the printer and while printing:

moving the carriage together with the printer along a first linear section of the at least two guides, moving the carriage together with the printer through one of the changeover sections connecting a first linear section with a second linear section of at least a first guide, and moving the carriage together with the printer along the second linear section of the first guide.

11. The method according to claim 10, wherein: detecting by the printer a reversal of a direction of movement parallel to the first direction, switching by the printer to the next swath to be printed responsive to the detected reversal of the direction of movement.

12. The device according to claim 5, wherein the thickness of the reference strip is below 0.7 mm.

13. The device according to claim 5, wherein the thickness of the reference strip is below 0.5 mm.

* * * * *